Patented Oct. 21, 1941

2,260,261

UNITED STATES PATENT OFFICE 2,260,261

CYCLIC KETALS AND PROCESS FOR PREPARING SAME

Glen H. Morey, Terre Haute, Ind., assignor to Commercial Solvents Corporation, Terre Haute, Ind., a corporation of Maryland No Drawing. Application January 27, 1940, Serial No. 315,972

11 Claims. (Cl. 260—338)

My invention relates to new and useful cyclic ketals and to methods of producing the same. More particularly, it relates to cyclic halogenated ketals of the following general structural formula:

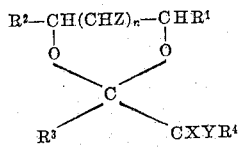

in which $R^1$ and $R^2$ may represent either hydrogen, alkyl, hydroxyalkyl, or polyhydroxy carbinol radicals, wherein at least one of the components $R^1$ and $R^2$, represents a carbon containing radical, $n$ represents zero or a numeral less than 3, $R^3$ is either cycloalkyl, aryl or alkyl, $R^4$ is alkyl or hydrogen, Z represents either hydrogen or hydroxyl, Y is either alkyl, halogen or hydrogen, and X is a halogen.

In accordance with my invention, halogenated cyclic ketals may be prepared with yields as high as 97% by reacting an alpha-halogenated ketone with a polyhydroxy compound, which is capable of condensing with said alpha-halogenated ketone, in the presence or absence of an acid catalyst and a water immiscible organic liquid capable of forming an azeotropic mixture with water. Such reactions are conveniently carried out in a suitable reaction vessel, to which there is attached an efficient fractionating column. After thorough mixing of the reactants and after the catalyst and water-immiscible material have been added thereto, the reaction mixture is heated to a temperature sufficient to cause moderate refluxing. As the water of reaction is formed, it is removed as a constant boiling mixture and conducted to a suitable separator from which the water may be withdrawn, and the water-immiscible layer returned to the reaction vessel. Completion of the reaction is evidenced by removal of approximately the theoretical quantity of water, which is liberated during the course of the reaction. When this stage of the procedure is reached, the water-immiscible material is completely driven off, and, if desired, air or an inert gas may be forced through the crude product in order to rid said product of any low boiling materials which might be present. The crude reaction product is then subjected to fractional vacuum distillation. Halogenated cyclic ketals obtained in this manner, are ordinarily sufficiently pure for the majority of technical uses. However, if desired, they may be further purified by additional vacuum distillation, or by other well-known methods, such as for example by subjecting such materials to various extraction procedures or treatment with decolorizing charcoal.

The polyhydroxy compounds and halogenated ketones, which may be employed in the preparation of my new compositions, constitute a wide range of substances. The class of halogenated ketones, in my process, are limited only to those included by the generic formula appearing below, whereas the polyhydroxy compounds, which may be employed in the preparation of these new compositions, comprise such compounds as ethylene glycol, glycerol, propylene glycol, 1,3-propanediol, 2-methyl-2,4-pentanediol, erythritol, mennitol, sorbitol, dulcitol, dextrin, sugar acids, and similar compounds which are capable of forming cyclic ketals under the conditions described above. Halogenated ketones, which may be utilized in the preparation of halogenated cyclic ketals, are represented by the following general structural formula:

in which R is either alkyl, or hydrogen, $R^1$ is either cycloalkyl, alkyl or aryl, Y is either alkyl, hydrogen or halogen, and X represents a halogen. As examples of halogenated ketones which are included by the above generic formula, there may be mentioned the mono- and unsymmetrically substituted di-alpha-halogenated derivatives of the following ketones: acetone, methyl, ethyl ketone, 2,2-dimethyl-3-pentanone, 3-methyl-2-butanone, acetophenone, methyl cyclo-hexyl ketone and the like.

Although cyclic ketals may be prepared from halogenated ketones of the type mentioned above, I have found that certain of their symmetrically and higher substituted analogs and homologs do not form such compounds under the conditions herein set forth. This fact has been substantiated by certain experiments in which I have found such halogenated ketones as symmetrical dichloroacetone and 1,1,3-trichloroacetone to be incapable of reacting with polyhydroxy compounds to form cyclic ketals under the above described conditions.

The catalyst utilized in the preparation of such cyclic ketals, may be any acid capable of giving a sufficiently strong acid reaction to promote ketalization, and it is to be understood that the term "catalyst" is to be construed as such. In the preparation of these compounds, however, I prefer to employ, as catalysts, mineral acids, such as hydrochloric acid, phosphoric acid, sulfuric acid, and the like. In this connection it is to be noted that my process may be carried out satisfactorily in the absence of an acid catalyst. However, I have found that the reaction does not proceed with as great rapidity in the absence of a catalyst, although the ultimate yield of cyclic ketal is approximately the same as in instances where an acid catalyst has been employed.

The water-immiscible organic materials which may be added to the reaction mixture, and which function to remove the water as a constant boiling mixture, constitute a long list of compounds. For example, such materials may be xylene, benzene, toluene, various petroleum hydrocarbons, and derivatives thereof, and the like; or in instances where the halogenated ketone, employed in the reaction, is capable of forming a constant boiling mixture with water, an excess of said halogenated ketone may be added to the reaction mixture and thereby serve as a satisfactory means for the removal of the water from said mixture. The reaction may also be carried out in the presence of an auxiliary solvent, such as ethyl alcohol, and as the reaction proceeds the alcohol and water may be removed from the mixture together with a water-immiscible substance, such as benzene, in the form of a ternary mixture.

Preparation of the halogenated cyclic ketals may be further illustrated by the following specific examples:

Example I

Three hundred and ten parts of ethylene glycol and 1270 parts of unsymmetrical dichloroacetone were mixed in a reaction vessel and 1.8 parts of concentrated sulfuric acid added thereto. The vessel containing this mixture was then connected to a fractionating column. As heat was applied to the reaction mixture, the water of reaction was removed as a constant boiling mixture with unsymmetrical dichloroacetone boiling at 88–90° C. (753 mm.) until approximately 95 parts had been collected. The excess unsymmetrical dichloroacetone was then completely distilled off, and the crude product fractionally distilled at 50 mm. pressure. The principal fraction, boiling at 108° C. (50 mm.), amounted to 718 parts corresponding to a yield of 84 per cent of the theoretical amount, based on the ethylene glycol. This product, 2-methyl-2-(dichloromethyl)-dioxolane, having the structural formula:

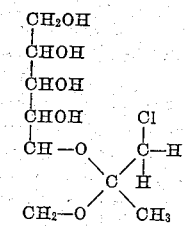

was a water-white substance possessing a pleasant odor.

Example II

Nine hundred and twenty parts of glycerol, 1555 parts of 3-chloro-2-butanone, 894 parts of benzene, and 29 parts of concentrated hydrochloric acid were placed in a reaction kettle having connected thereto a suitable fractionating column. The resulting mixture was then brought to refluxing temperature, and held at this temperature until the theoretical quantity of water had been removed as an azeotropic mixture of benzene and water. The benzene remaining in the reaction mixture was then distilled off, the product heated to 100° C., and a stream of carbon dioxide passed through the mixture at 25 mm. pressure for approximately 2 hours to remove any traces of benzene or other low-boiling material. The entire crude product was then subjected to vacuum distillation, and a total of 1751 parts of product was collected, corresponding to a yield of 97% based on the glycerol. This product, 2-methyl-2-(1-chloroethyl-4-hydroxymethyl-dioxolane, was a water-white compound boiling at 210° C. (753 mm.).

Example III

One hundred and ninety-one parts of d-sorbitol and 740 parts of chloroacetone were placed in a reaction kettle and 1.8 parts of concentrated sulfuric acid added thereto. The kettle was then attached to a suitable fractionating column, and the contents heated to refluxing temperature. The water formed during the reaction was withdrawn as a constant boiling mixture with chloroacetone. After 85 parts of water had been removed in this manner, the excess chloroacetone was distilled off under reduced pressure. The crude reaction material distilled at 190–200° C. (1 mm.) pressure giving 268 parts of a pale yellow viscous syrup. The entire product was further purified by dissolving in methanol, and the resulting solution treated with decolorizing charcoal. The decolorizing material was then filtered off, and the filtrate fractionally distilled. The resulting product, which was chiefly d-sorbitol-chloroacetone ketal, having the structural formula:

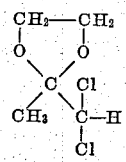

was a pale yellow liquid boiling at approximately 200° C. (1 mm.).

Cyclic ketals of the halogenated ketones, included by the above generic formula, are in general water-white, mobile to viscous liquids of agreeable odor, and are relatively stable at elevated temperatures. These products have been found to be suitable for use as solvents for various resin compositions and are similarly suitable for use as intermediates in the preparation of numerous organic compounds. Other uses of such materials will be readily apparent to those skilled in the art.

The table given below shows various physical properties of the halogenated cyclic ketals covered by my invention.

| Compound | B. P., °C. | Specific gravity, 20°/20° C. | $N_d^{20}$ |
|---|---|---|---|
| 2, 4-dimethyl-2-(chloromethyl)-dioxolane | Mm. 167.4/753 | 1.095 | 1.43768 |
| 2-methyl-2-(chloromethyl)-1, 3-dioxane | 107/50 | 1.1709 | 1.46114 |
| 2-methyl-2-(1-chloroethyl)-4-hydroxymethyl-dioxolane | 210/753 | -------- | -------- |
| 2, 4-dimethyl-2-(dichloromethyl)-dioxolane | 188/753 | -------- | -------- |
| 2-methyl-2-(dichloromethyl)-dioxolane | 193.4/753 | 1.2972 | 1.46545 |

While the above physical properties will undoubtedly aid in the identification of these compounds, it is to be understood that I do not desire to be limited to products possessing the exact physical constants described above, since these data were obtained from single samples of the various compounds listed.

My invention now having been described, what I claim is:

1. Cyclic ketals having the following structural formula:

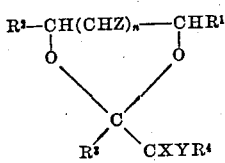

wherein $R^1$ and $R^2$ are radicals selected from the group consisting of hydrogen, alkyl, hydroxyalkyl and polyhydroxy carbinol in which at least one of the components $R^1$ and $R^2$ is a carbon containing radical, $R^3$ is a radical selected from the group of hydrocarbon radicals consisting of cycloalkyl, aryl, and alkyl, $R^4$ is a radical selected from the group consisting of alkyl and hydrogen, Z is a member of the group consisting of hydrogen and hydroxyl, Y is a radical selected from the group consisting of halogen, hydrogen and alkyl, X is a halogen and $n$ is zero or a numeral less than 3.

2. Cyclic ketals having the following structural formula:

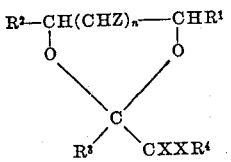

wherein $R^1$ and $R^2$ are radicals selected from the group consisting of hydrogen, alkyl, hydroxyalkyl and polyhydroxy carbinol, $R^3$ is a radical selected from the group of hydrocarbon radicals consisting of cycloalkyl, aryl and alkyl, $R^4$ is a radical selected from the group consisting of alkyl and hydrogen, Z is a member of the group consisting of hydrogen and hydroxyl, X is a halogen and $n$ is zero or a numeral less than 3

3. Cyclic ketals having the following structural formula:

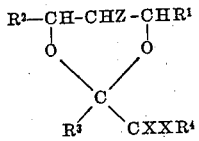

wherein $R^1$ and $R^2$ are radicals selected from the group consisting of hydrogen, alkyl, hydroxyalkyl, and polyhydroxy carbinol, $R^3$ is a radical selected from the group of hydrocarbon radicals consisting of cycloalkyl, aryl and alkyl, $R^4$ is a radical selected from the group consisting of hydrogen and alkyl, Z is a member of the group consisting of hydrogen and hydroxyl, and X is a halogen.

4. 2-methyl-2-(dichloromethyl)-dioxolane.

5. 2,4-dimethyl-2-(chloromethyl)-dioxolane.

6. A process for the preparation of cyclic ketals, which comprises reacting a polyhydroxy compound with a halogenated ketone having the structural formula:

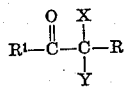

wherein R is a member selected from the group consisting of alkyl and hydrogen, $R^1$ is a member selected from the group consisting of cycloalkyl, alkyl and aryl, Y is a member selected from the group consisting of alkyl, halogen and hydrogen, and X is a halogen, and continuously removing the water formed during the reaction as a constant boiling mixture.

7. A process for the preparation of cyclic ketals, which comprises reacting a polyhydric alcohol with a halogenated ketone having the structural formula:

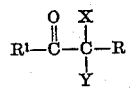

wherein R is a member selected from the group consisting of alkyl and hydrogen, $R^1$ is a member selected from the group consisting of cycloalkyl, alkyl and aryl, Y is a member selected from the group consisting of alkyl, hydrogen and halogen, and X is a halogen, in the presence of a catalyst and continuously removing the water formed during the reaction as a constant boiling mixture.

8. A process for the preparation of cyclic ketals which comprises reacting a polyhydroxy compound with mono-substituted alpha-halogenated ketones having the structural formula:

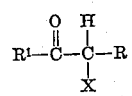

wherein R is a member selected from the group consisting of alkyl and hydrogen, $R^1$ is a member selected from the group consisting of cycloalkyl, alkyl and aryl, and X is a halogen, in the presence of a catalyst and continuously removing the water formed during the reaction as a constant boiling mixture.

9. A process for the preparation of cyclic ketals which comprises reacting a polyhydroxy compound with an unsymmetrically substituted di-alpha-halogenated ketone having the structural formula:

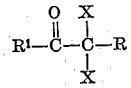

wherein R is a member selected from the group consisting of alkyl and hydrogen, $R^1$ is a member selected from the group consisting of cycloalkyl, alkyl and aryl, and X is a halogen, in the presence of a catalyst and continuously removing the water formed during the reaction as a constant boiling mixture.

10. A process for the preparation of cyclic ketals which comprises reacting a polyhydric alcohol with a mono-substituted alpha-halogenated ketone having the structural formula:

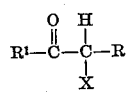

wherein R is a member selected from the group consisting of alkyl and hydrogen, $R^1$ is a member selected from the group consisting of cycloalkyl, alkyl and aryl, and X is a halogen, in the presence of a catalyst and continuously removing the water formed during the reaction as a constant boiling mixture.

11. A process for the preparation of cyclic ketals which comprises reacting a polyhydric alcohol with an unsymmetrically substituted dialpha-halogenated ketone having the structural formula:

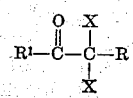

wherein R is a member selected from the group consisting of alkyl and hydrogen, $R^1$ is a member selected from the group consisting of cyclohexyl, alkyl and aryl, and X is a halogen, in the presence of a catalyst and continuously removing the water formed during the reaction as a constant boiling mixture.

GLEN H. MOREY.